United States Patent [19]

Frasier

[11] 4,344,138

[45] Aug. 10, 1982

[54] DIGITAL AIR BRAKE CONTROL SYSTEM

[76] Inventor: Cline W. Frasier, 336 Hayward Mill Rd., Concord, Mass. 01742

[21] Appl. No.: 203,556

[22] Filed: Nov. 5, 1980

[51] Int. Cl.$^3$ ................ B60T 13/68; G06F 15/20
[52] U.S. Cl. ............................... 364/426; 105/61; 303/20
[58] Field of Search ............... 364/426; 303/16, 20; 246/182 B; 105/61

[56] References Cited

U.S. PATENT DOCUMENTS

| | | | |
|---|---|---|---|
| 3,380,399 | 4/1968 | Southard et al. | 105/61 |
| 3,539,226 | 11/1970 | Barber | 303/20 |
| 3,583,771 | 6/1971 | Dressler, Jr. | 303/20 |
| 3,588,186 | 6/1971 | Worbois | 303/20 |
| 3,696,758 | 10/1972 | Godinez, Jr. | 105/61 |
| 3,716,274 | 2/1973 | Pier | 303/20 |
| 3,799,623 | 3/1974 | Wickham et al. | 303/20 |
| 4,056,286 | 11/1977 | Burkett | 303/20 |
| 4,316,640 | 2/1982 | Cripe | 303/20 |

*Primary Examiner*—Jerry Smith
*Attorney, Agent, or Firm*—Otto Wildensteiner; Harold P. Deeley, Jr.

[57] ABSTRACT

A microcomputer-operated air brake control system for controlling the air brakes of a railroad car in a train is disclosed. The system includes a plurality of pressure sensors pneumatically connected to various points in the air brake system of the car and electrically connected to the input of the microcomputer. An ultrasonic height sensor for load compensation and detection of railroad derailments may also be connected to the input of the microcomputer. The output of the microcomputer is electrically connected to a plurality of electro-pneumatic valves for controlling the flow of compressed air to the brake cylinder of the car. The system also includes a radio transceiver electrically connected to the microcomputer for both receiving braking commands from a central control unit in the locomotive and transmitting feedback information from the air brake system back to the central control unit. The microcomputer is programmed to execute braking commands received either by the radio from the central control unit in the locomotive, or pneumatically through the train air line. While cars equipped with the system of the invention are preferably used exclusively with other railroad cars so equipped, they may also be used in any proportion in the same train with railroad cars utilizing conventional air brake equipment. The microcomputer on each car so equipped is individually powered by its own air driven power supply.

7 Claims, 14 Drawing Figures

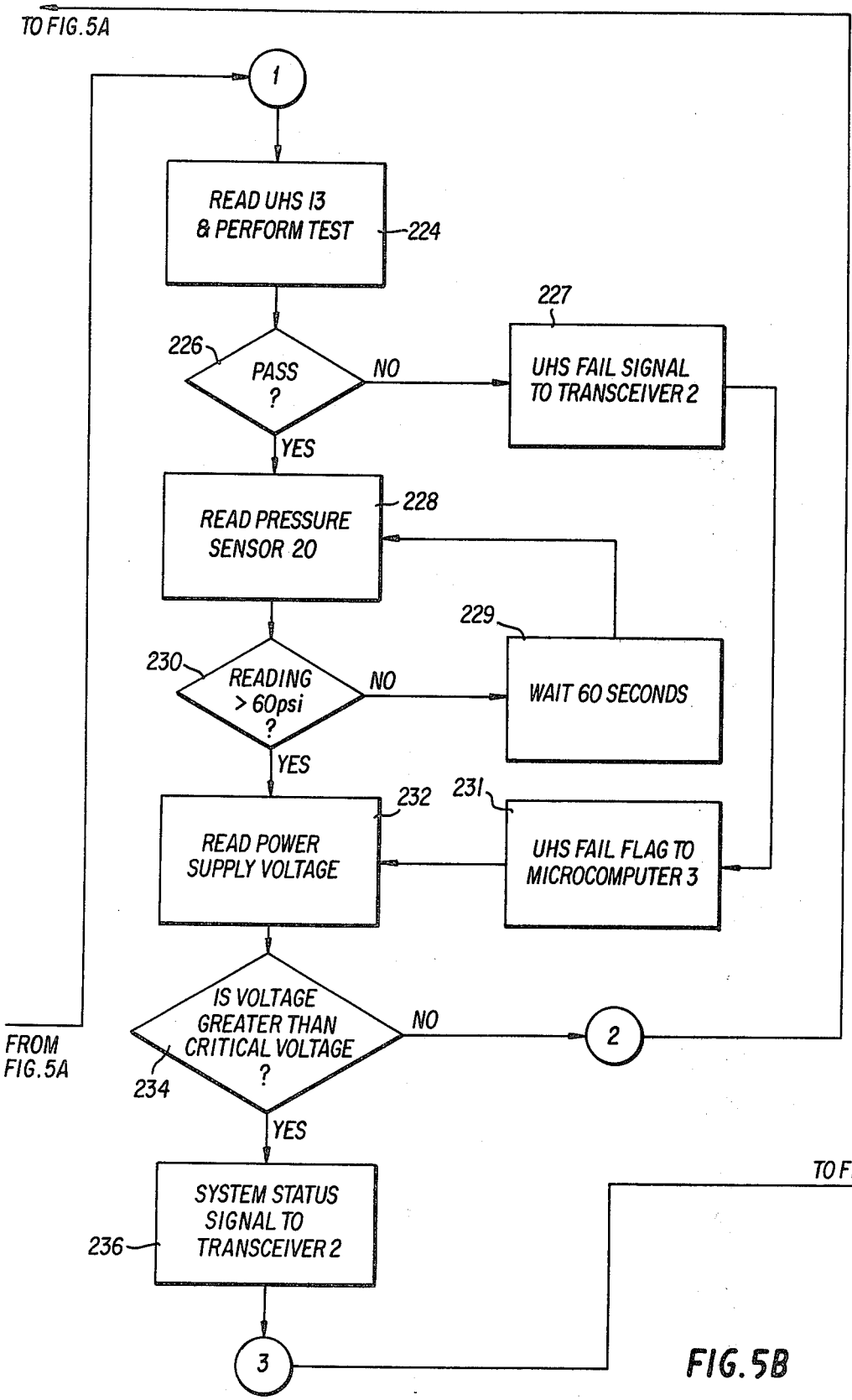

DIGITAL AIR BRAKE CONTROL SYSTEM

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

1. Field of the Invention

This invention generally relates to computer-operated air brake control systems for railroad cars.

2. Background of the Prior Art

Electronically controlled air brake systems for multi-unit trains are generally known in the prior art. For example, U.S. Pat. No. 3,380,399 discloses a remote control train and supervision system for a railroad train which employs solid state logic circuits in the brake system of a master locomotive for controlling the brake system of a slave locomotive via a radio link. A master locomotive transmits radio commands to a slave locomotive every thirty seconds in the form of a computer word comprising address, information, and check bits defining a comprehensive recapitulation of all controls. The master locomotive receives a word message in return from the slave, which relays the braking conditions present at the slave.

Another example of an electronically operated locomotive brake control system is disclosed in U.S. Pat. No. 3,560,055. Here, a manually operable brake valve on a lead locomotive effects control of an electropneumatic brake valve on a slave locomotive via radio commands. Similarly, U.S. Pat. No. 3,374,035 discloses a brake control system in which control of a multi-unit brake line is sectionalized by a main locomotive which controls the brake system of a helper locomotive by way of radio signals. Still other electronically controlled air brake systems are disclosed in U.S. Pat. Nos. 3,539,226, 3,583,771, 3,588,186, 3,799,623, 4,013,323, and 4,056,286.

Such prior art electronic air brake control systems have many advantages over older air brake controls which rely exclusively on pneumatic signals transmitted over the train air line to effect braking. Such electronic systems allow the train brakes to be applied much more simultaneously throughout multi-unit trains, thus facilitating emergency stops and reducing the stress on car couplings.

However, such prior art electronic systems are not without shortcomings. For example, the systems disclosed in U.S. Pat. Nos. 3,374,035, 3,380,399, 3,539,226, 3,560,055, 3,583,771 and 3,588,186 are designed to operate only between individual train units of multi-unit trains, rather than as between individual car units of a single train of cars. In such systems, there would still exist a lag time between the application of the brakes in the locomotive and the application of the brakes of the cars of the individual trains. Additionally, systems such as that disclosed in U.S. Pat. No. 3,380,399 are very complicated, which increases both the expense of manufacture as well as the chances of a malfunction.

While systems such as those disclosed in U.S. Pat. Nos. 3,799,623, 4,013,323, and 4,056,286 may be used on two or more cars in the same train unit, they too are not without shortcomings. For example, the systems disclosed in U.S. Pat. Nos. 4,013,323 and 4,056,286 are designed to be used only on the locomotive and the caboose of a train. While such a design can lower the lag time between the application of the various brakes of the train, it cannot eliminate it entirely. Finally, while the system disclosed in U.S. Pat. No. 3,799,623 could be used on each individual car of a train, the specific design of this system calls for a network of special electrical wiring extending the entire length of the train, which renders this system difficult to mix with conventional railroad cars which have no provision for such special wiring.

Clearly, the prior art has not yet developed an electronic air brake control system which is capable of effecting simultaneous braking between all the cars of a single train of cars, and which is fully compatible with railway cars having no special equipment.

SUMMARY OF THE INVENTION

The invention generally concerns a microcomputer-operated air brake control system for controlling the air brakes of a railroad car. Such air brakes typically include a pneumatically operated brake cylinder pneumatically connected through appropriate valves to both an auxiliary air reservoir and an emergency air reservoir, both of which are in turn connected to a train air line which runs the length of the train.

In the invention, the train air line is connected in parallel to an auxiliary air reservoir and an emergency air reservoir through first and second check valves, respectively. The auxiliary air reservoir and the emergency air reservoir are each connected to the brake cylinder through first and second normally closed electropneumatic valves. A third normally closed electropneumatic valve is connected to the brake line of the brake cylinder and controls the venting thereof. Each of these three pneumatic valves is electrically controlled by the output of a microcomputer which is powered by its own individual air driven power supply.

The system includes a differential pressure sensor pneumatically connected across the first check valve for measuring the difference in pressure between the train air line and the auxiliary reservoir and electrically relaying the value of this pressure to the microcomputer. The system further includes a first pressure sensor pneumatically connected to the train air line, a second pressure sensor pneumatically connected between the first check valve and the auxiliary air reservoir, a third pressure sensor pneumatically connected between the second check valve and the emergency air reservoir, and a fourth pressure sensor pneumatically connected to the brake cylinder. Each of these pressure sensors measures the pressure of the air at its respective location, and electrically relays the value of this air pressure into the input of the microcomputer.

In addition to the pressure sensors, a radio transceiver for receiving braking signals from a central control unit which may be included in the locomotive is also connected to the input of the microcomputer. The pressure sensors and the radio transceiver allow the microcomputer to respond to signals transmitted from a central control unit, in addition to pneumatic braking signals transmitted through the train air line.

If the system includes a central control unit, the sequence of operation is as follows. First, the auxiliary and emergency air reservoirs are charged by the train air line through their respective check valves. The first pressure sensor monitors the rising pressure of the train air line and electrically communicates these rising values to the microcomputer. The microcomputer is programmed to fully actuate itself upon receiving a train air line pressure reading of forty pounds per square inch. Next, the microcomputer turns on, and determines whether or not all of the electropneumatic valves and the brake cylinder are operational. If it detects that any of these components are non-operational, it transmits a signal to this effect over its transceiver to the central control unit. Assuming all components check out, the locomotive engineer operating the central control unit next selects a desired braking level, and transmits this information to all of the cars equipped with the system. The cars equipped with the system receive this signal, store the message and actuate their respective microcomputers. The microcomputers of each car so equipped then interrogates each of the pressure sensors electrically connected to it, and calculates the length of time the first and third electropneumatically valves must be opened to achieve the desired air pressures. This computative process is iterated until the brake cylinder pressure stabilizes at the level required to provide the braking level commanded by the central control unit. When the engineer desires to brake the train, he transmits a braking command through the central control unit which is in turn received by the transceiver units of the cars equipped with the system. The microcomputer of each car so equipped simultaneously opens its respective first electropneumatic valve, thereby putting the auxiliary air reservoir in fluid communication with the brake cylinder and braking the car. Thus the "lag time" associated with conventional pneumatic braking signals transmitted across the train air line is effectively eliminated in each of the cars equipped with the invention. This, in turn, results in better emergency stops, in shorter stopping distances, and less stress on the couplings between the railway cars.

The system is also capable of working without a central control unit. In this case, the microcomputer adjusts the brakes to a braking level related to a decrease in train air line pressure. The microcomputer is programmed to apply the brakes of the car whenever the pressure sensor connected to the train air line detects a pressure drop of more than seven pounds per square inch per minute.

Thus, cars utilizing the system of the invention are fully compatible with conventionally equipped cars and may be intermixed therewith in any proportion. The reduction in braking "lag time" depends on whether or not a central control unit is employed, and is directly proportional to the relative amount of cars equipped with the invention.

The invention may also include an ultrasonic height sensor electrically connected to the input of the microcomputer for providing automatic load compensation and automatic derailment detection.

BRIEF DESCRIPTION OF THE DRAWINGS

In all of the figures, like numbers refer to like component parts of the invention.

DETAILED DESCRIPTION OF THE PREFERRED EMBODIMENT

GENERAL SYSTEM DESCRIPTION

Figure 1:
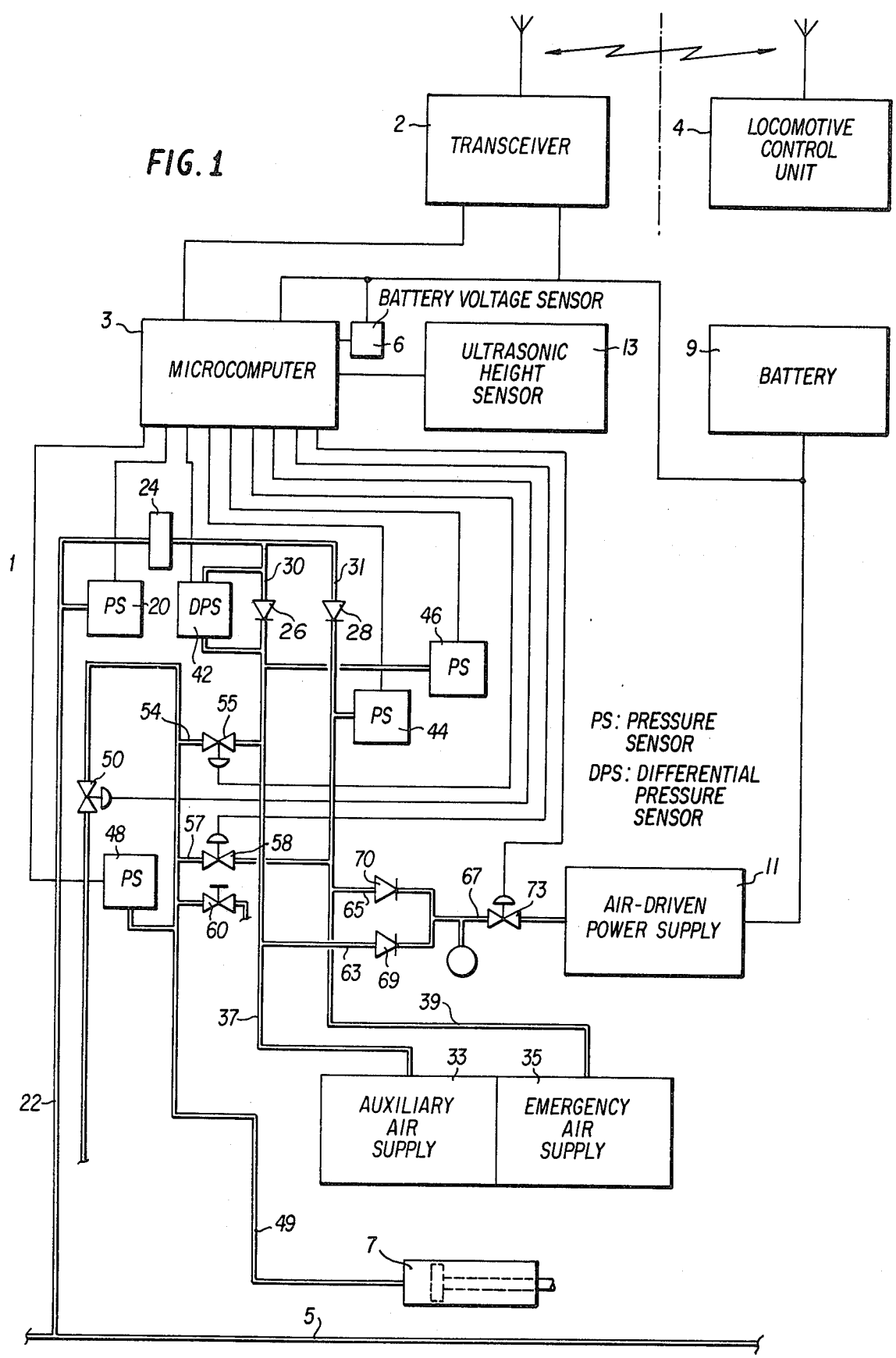
FIG. 1 is a schematic diagram of the braking system of the invention.

With reference to FIG. 1, the digital air brake system of the invention generally comprises a set of electropneumatic valves and pressure sensors (indicated generally at 1) which are connected to a microcomputer 3 for regulating the flow of pneumatic power between a train air line 5 and the brake cylinder 7 of a train car. The microcomputer 3 is powered by rechargeable battery 9 which is recharged by an air driven power supply (ADPS) 11, and is electrically connected to a radio transceiver unit 2 which receives and transmits radio signals from a radio operated locomotive control unit 4. A battery voltage sensor 6 is electrically connected to the output of battery 9 and functions to measure the voltage of battery 9. Finally, in the preferred embodiment, an ultrasonic height sensor 13 for automatic load compensation and derailment detection is mechanically connected onto the underside of the car and electrically connected to the microcomputer 3. The height sensor 13 may be of conventional design and does not itself form a part of the instant invention.

Pneumatic power from a train air line 5 is conducted to a pair of check valves 26, 28 via a conduit 22 which bifurcates into a pair of conduits 30 and 31, as shown. An air filter 24 is fluidly coupled across the path of conduit 22 and functions to filter out extraneous fluids and particles which may interfere with the proper functioning of the check valves 26 and 28. A pressure sensor 20 is fluidly connected to conduit 22 and electrically connected to the input of microcomputer 3. Pressure sensor 20 functions to measure the pressure of this system at conduit 22 and to relay this information to the microcomputer 3 for a purpose which will be described in detail hereinafter.

Check valves 26 and 28 conduct pneumatic power from the train air line 5 into an auxiliary air reservoir 33 and an emergency air reservoir 35, respectively, via conduits 37 and 39. Because a check valve only allows air to flow in one direction through it, the check valves 26 and 28 block air from flowing from the auxiliary air reservoir 33 or the emergency air reservoir 35 back into the train air line 5.

A differential pressure sensor 42 is pneumatically connected across check valve 26 and electrically connected to the input of the microcomputer 3 as indicated. This differential pressure sensor 42 measures the difference in air pressure across check valve 26 and relays this information to the microcomputer 3. Pressure sensors 44 and 46 are connected to conduits 39 and 37, respectively, and are likewise electrically connected to the input of microcomputer 3 for a purpose which will become evident hereinafter.

The brake cylinder 7 is pneumatically connected via conduit 49 and electropneumatic valve 50 to the ambient atmosphere. Auxiliary air reservoir 33 is connected to brake cylinder conduit 49 via an electropneumatic valve 55 and conduit 54. Emergency air reservoir 35 is connected to brake cylinder conduit 49 via an electropneumatic valve 58 and conduits 57 and 39. A manually operated valve 60 is also connected to brake cylinder conduit 49 in the position shown to vent conduit 49 into the ambient atmosphere when this becomes desirable.

Finally, auxiliary air reservoir 33 and emergency air reservoir 35 are both pneumatically connected to an air driven power supply 11 via a pair of conduits 63 and 65 which are connected to the main conduit 67 leading into the air driven power supply 11. Check valves 69 and 70 on conduits 63 and 65, respectively, insure that air will not flow between air reservoirs 33 and 35. Additionally, conduit 67 includes a normally open electropneumatic valve 73 which is electrically connected to the output of the microcomputer 3 for controlling the flow of air from the air reservoirs 33 and 35 to the air driven power supply 11.

Electropneumatic Valve System

Figure 2:
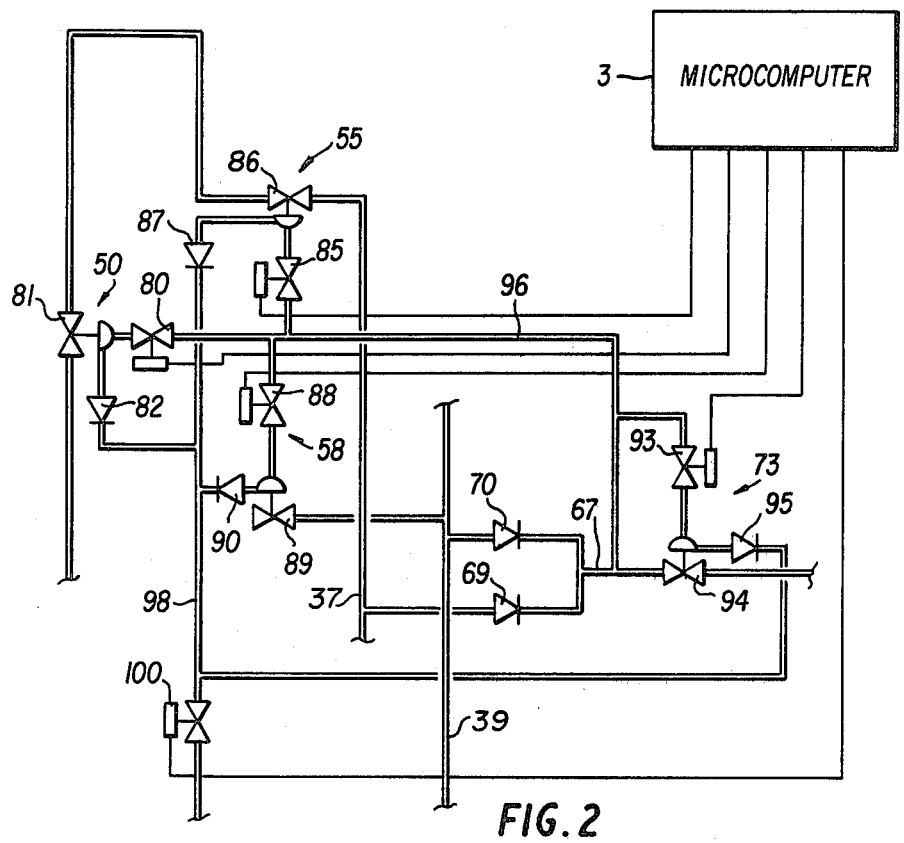
FIG. 2 illustrates the network of electropneumatic valves used in the braking system of the invention.

With reference now to FIG. 2, each of the electropneumatic valves 50, 55, 58 and 73 in this system, includes a solenoid-actuated valve (indicated at 80, 85, 88 and 93, respectively) in combination with a main valve (indicated at 81, 86, 89 and 94, respectively). Each of the solenoid-actuated valves is electrically connected to the microcomputer 3 as indicated. The solenoid-actuated valves 80, 85, 88 and 93 function as fluid amplifiers, in that they allow a low power output signal from the microcomputer 3 to open or close one or more of the relatively high capacity main valves 50, 55, 58 and 73. The mechanism by which this control is accomplished will be described in detail hereinafter. Each of the solenoid-actuated valves 80, 85, 88, and 93 includes a valve control inlet which is pneumatically connected to the auxiliary air reservoir 33 and the emergency air reservoir 35 via conduit 67 and valve opening conduit 96. Each of the valves 80, 85, 88 and 93 also includes a valve control outlet which is connected to a common dump conduit 98 via check valves 82, 87, 90 and 95, respectively. Dump conduit 98 terminates in an electropneumatic dump valve 100 which is electrically connected to the output of microcomputer 3 as indicated. The use of check valves 82, 87, 90 and 95 permits the use of the single pneumatic dump valve 100, as will become more evident hereinafter.

Figure 3:
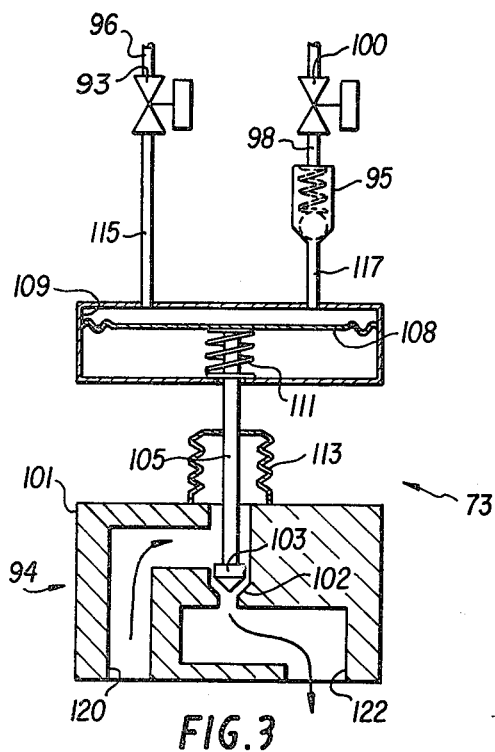
FIG. 3 is a cross-sectional view of one of the normally opened electropneumatic valves used in the preferred embodiment of the system.

FIG. 3 is a cross-sectional view of the type of normally-open electropneumatic valve used for valve 73. This valve includes two major parts, including a solenoid-actuated valve portion 93 and a main valve portion 94.

The main valve portion 94 includes a housing 101 having a conical valve seat 102 in its interior disposed between a main valve inlet 120 and the main valve outlet 122. Main valve section 94 further includes a conical valve element 103 which is complementary in shape to the valve seat 102 and which is connected to the proximal end of a valve stem 105. The valve stem is in turn mounted onto a valve piston element 108, which reciprocates within a valve cylinder 109. A valve spring 111 is helioconcentrically disposed around the distal end of valve stem 105 between the valve piston element 108 and the bottom wall of valve cylinder 109 and functions to bias the conical valve element 103 toward its complementary valve seat 102. Assisting valve spring 111 in its biasing function is bellows element 113 which is concentrically disposed around and connected to the valve stem 105. Valve spring 111 and bellows element 113 cooperate to hold valve element 103 against the valve seat 102 until the pressure in main valve inlet 120 exceeds 35 psi, thereby making the valve 73 a normally opened valve under operating conditions where the train air line 5 is pressurized.

The solenoid-actuated portion of the valve 73 includes a valve control inlet 115 which is fluidly connected to the valve opening conduit 96 via normally closed solenoid-operated valve 93, and a valve control outlet 117, which is fluidly connected to the common dump conduit 98 through check valve 95. Another normally closed solenoid-operated valve 100 controls the release of compressed air from the valve cylinder 109 via the common dump conduit 98. Check valve 95 may be any one of a variety of a conventional, spring-loaded check valves and is not itself a part of the present invention.

In operation, valve 73 is closed by opening solenoid valve 93, thereby admitting compressed air from valve opening conduit 96 into the upper part of cylinder 109. Conversely, valve 73 is opened by closing solenoid valve 93 and opening solenoid valve 100, thereby allowing compressed air from the upper part of cylinder 109 to flow into common dump conduit 98.

Figure 4:
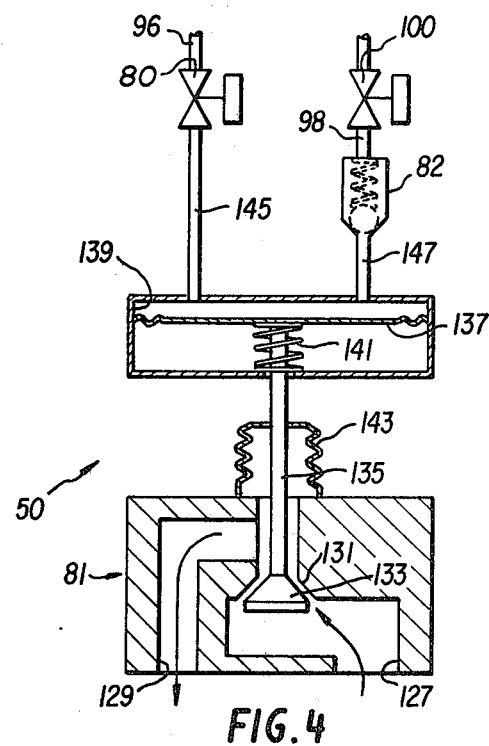
FIG. 4 is a cross-sectional view of one of the normally closed electropneumatic valves of the invention; and, FIGS. 5A–5J are flowcharts illustrating the operation of the microcomputer of the invention.

FIG. 4 is a cross-sectional view of the type of valve used for electropneumatic valve 50, which is of the normally-closed type. It is to be understood that normally-closed valves 55 and 58 are also of the type and construction shown in FIG. 4. As in the case of valve 73, the valve 50 includes a solenoid actuated valve portion 80, and a main valve portion 81. Main valve portion 81 includes a main valve inlet 127 and a main valve outlet 129, as shown. A valve seat 131 is pneumatically disposed between the valve inlet 127 and outlet 129. A frustroconical valve element 133 is normally seated in the valve seat 131. A valve stem 135 mechanically couples frustoconical valve element 133 to a valve piston 137 housed within a valve cylinder 139. A valve spring 141 is helioconcentrically disposed around the distal end of valve stem 135 between the valve piston 137 and the bottom wall of the valve cylinder 139 and biases the valve element 133 against the valve seat 131. Assisting valve spring 131 in this function is bellows element 143 which is connected to the valve stem 135 in the position indicated. Coupled to the top wall of valve cylinder 139 are a control inlet 145 and a control outlet 147. The control inlet 145 is pneumatically connected to the valve opening conduit 96 through solenoid-operated valve 80. In a similar manner, solenoid-operated valves 85 and 88 (FIG. 2) connect the valve opening conduit 96 to the control inlets of valves 55 and 58, respectively. The control outlet 147 of valve 50 is pneumatically connected to the common dump conduit 98 and solenoid-operated valve 100 via check valve 82. Similarly, the control outlets of valves 55 and 58 (FIG. 2) are connected to the common dump outlet 98 and solenoid-operated valve 100 via check valves 87 and 90, respectively.

When solenoid-actuated valve 80 is opened, compressed air from valve opening conduit 96 is admitted into valve cylinder 139, where it depresses valve piston 137 down against valve spring 141, thereby unseating the valve element 133 from its valve seat 131. When solenoid-actuated valve 80 is closed and 100 is opened, compressed air between the upper surface of valve piston 137 and the upper wall of valve cylinder 139 flows into common dump conduit 98 via control outlet 147 and check valve 82, thereby closing the valve 50.

An important feature of the foregoing valve designs is their ability to operate on very small amounts of electrical energy. For the valves, this is accomplished by the design shown in FIG. 4 which requires only very short periods of operation of the solenoid operated valve 80 relative to the duration of the operation of the main valve portion 81. This can be explained by the following example. It will be supposed that the pressure in brake cylinder 7 (FIG. 1) is desired to be 50 psi, and that the pressure measured by pressure sensor 48 is 20 psi and the pressure measured by pressure sensor 46 is 100 psi. Then, based on the relative areas of bellows 143 and valve piston 137 and the spring rate of valve spring 141, an estimate of the time that solenoid valve 80 must be opened to admit enough air from valve opening conduit 96 to valve cylinder 139 to initially open the main valve portion 94, and then allow it to close when the pressure in main valve outlet 129 reaches 50 psi, can be computed by microcomputer 3. The closing is caused by the combined force on valve stem 135 from the air pressure in bellows 133 and valve spring 141 overcoming the force on valve stem 135 from air pressure in valve cylinder 139 acting on valve piston 137. Even if several seconds are required to reach 50 psi, the only electrical power required is that necessary to open solenoid valve 80 for a few milliseconds. In operation, the electrical signal sent to solenoid valve 80 may be made slightly shorter in time than the estimated value to achieve the desired pressure. Then, microcomputer 3 may be programmed to recompute the time required during each computing cycle, so that the pressure in main valve outlet 129 more closely approaches the desired pressure after each computing cycle.

Microcomputer Operation

FIGS. 5A through 5J are flow charts representing the operation of the microcomputer 3 of the present system.

Figure 5A:
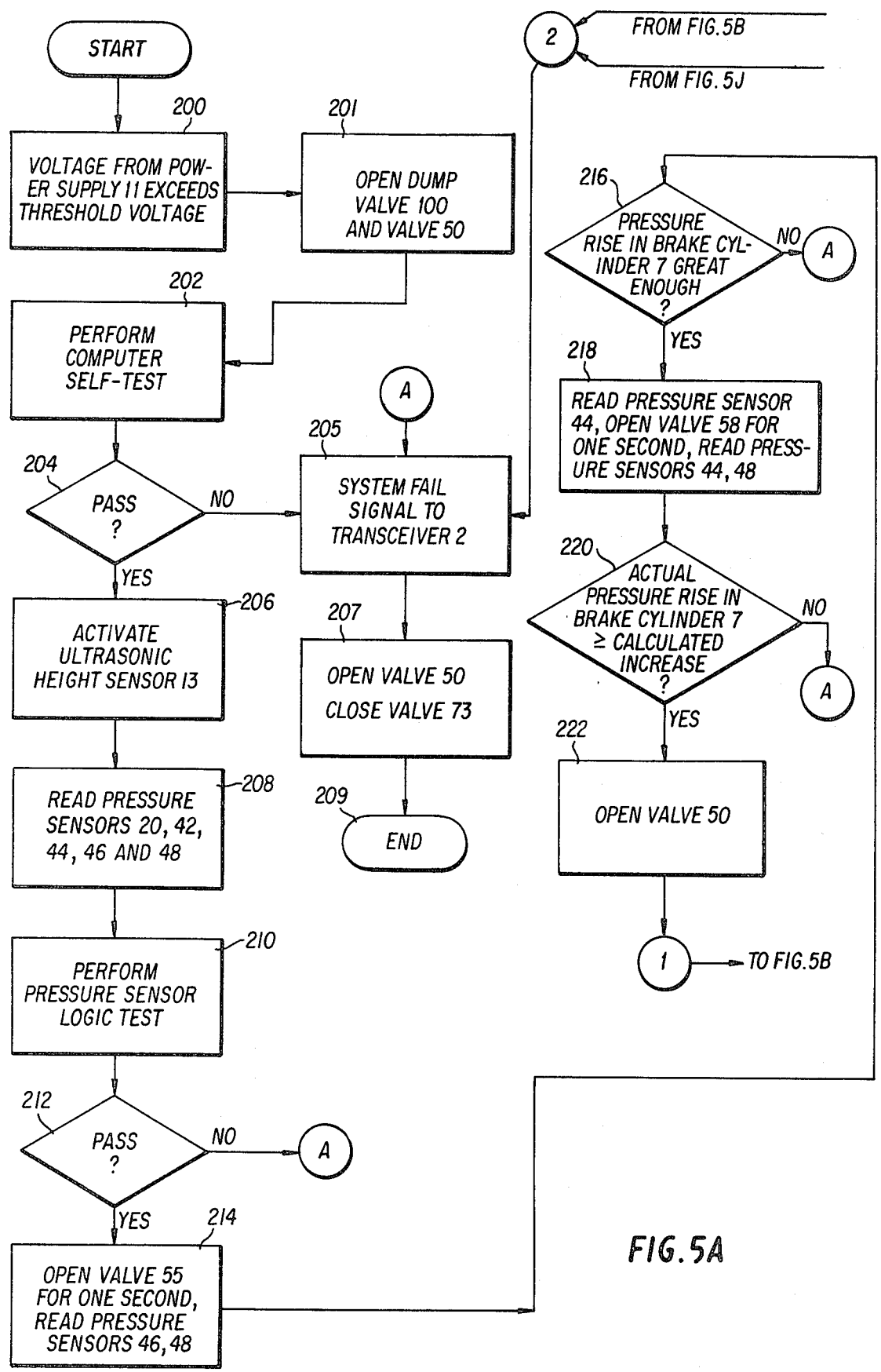

With reference to FIG. 5A, the operation of the digitally controlled air brake system of the invention starts at block 200 when the voltage from the power supply 9 exceeds the threshold voltage necessary to switch the microcomputer 3 on. The microcomputer 3 is usually switched on within two or three minutes after the pressure in the train air line 5 (FIG. 1) reaches 40 pounds per square inch.

After the microcomputer 3 is actuated, it proceeds to block 201 of the program, where it commands the solenoid-actuated dump valve 100 to open and to close and then commands electropneumatic valve 50 to open. After five seconds, valve 100 is opened and closed again. With this initial step, the electropneumatic valves 50, 55, 58 and 73 are in their correct positions before the computer proceeds to the next block 202. Further, the "open valve 50" command insures that there is no pressure in brake cylinder 7 (FIG. 1) that would affect the outcome of the self-testing procedures to follow.

Upon proceeding to block 202, in FIG. 5A, the microcomputer 3 executes a self-test procedure in which it completely checks out its internal functions. This procedure is conventional and does not itself form a part of the present invention. After the computer self-test is completed, the microcomputer 3 proceeds to the first decision point 204 of the program. If the computer passes its self-test, it passes to block 206 of the program, and activates the ultrasonic height sensor 13. If the microcomputer 3 fails its self-test, it proceeds to "fail subroutine A," which includes blocks 205, 207 and 209.

If the microcomputer 3 proceeds to "fail subroutine A," it executes the instructions of block 205, and sends a "system fail" signal to the transceiver 2, which in turn relays the "system fail" signal to the locomotive control unit 4. The microcomputer 3 then proceeds to block 207 and opens electropneumatic valve 50 and closes electropneumatic valve 73. This sequence effectively eliminates all braking of the individual railway car.

However, if the microcomputer 3 passes the self-test, it proceeds to block 206 of the program, and actuates the ultrasonic height sensor 13, waits an appropriate period of time (which will ordinarily be less than 10 milliseconds) and reads and stores the height reading from the ultrasonic sensor 13. After this step is accomplished, the microcomputer 3 proceeds to block 208 of the program, and reads and stores the values sensed by each of the pressure sensors 20, 42, 44, 46, and 48 at their respective locations. After this step is accomplished, the microcomputer 3 proceeds to block 210 and subjects the pressure sensors to a series of tests to determine whether or not they are operating correctly.

In the first of these tests at block 210, the microcomputer 3 subtracts the reading of pressure sensor 46 from the reading of pressure sensor 44 to see whether or not the resulting difference is equal within 2 psi. These two pressure readings should be exactly the same except for differences caused by tolerance variations in the two check valves 26 and 28. This test assumes that the tolerance for a successful test is within 2 psi of the same reading.

The next test that the microcomputer performs at block 210 is to subtract the reading of pressure sensor 46 from that of pressure sensor 20 to see whether the difference is greater than 1 psi or less than 6 psi. These two readings should differ only by the pressure drop across check valve 26, plus whatever tolerances there are in this check valve and in the pressure sensors themselves. This test provides a crude indication of the operability of air filter 24. If air filter 24 is clogged, an excess pressure drop across it will be added to that of check valve 26 and cause failure of this second test.

The third test performed in block 210 validates the operation of the differential pressure sensor 42 by determining whether or not the pressure measured by sensor 42 is between 2.5 and 3.5 psi. These numbers were selected on the basis of an assumed pressure setting for check valve 26 and assumed tolerance values for the valve 26 and the differential pressure sensor 42.

The fourth and final test which occurs at block 210 determines whether or not the reading of pressure sensor 48 is less than 2 psi. Since the brake cylinder 7 was vented by electropneumatic valve 50 just prior to the initiation of this testing sequence, a pressure reading above 2 psi at this time in the operation of the invention indicates either a serious valve leakage in electropneumatic valves 55 or 57 or a failure of pressure sensor 48.

The microcomputer 3 next proceeds to decision point 212. If any of the preceding four tests were failed, the microcomputer 3 proceeds to "fail subroutine A," previously described in detail.

However, if all four of the foregoing tests were passed, the microcomputer 3 proceeds to block 214 and tests the performance of the electropneumatic valves of the system, as well as the pressure sensors, to make sure that all the major components of the system are fully operable. The microcomputer 3 performs this test by reading pressure sensor 48, opening electropneumatic valve 55 for one second and then closing it, and then reading the pressure sensors 46 and 48.

After performing these steps, the microcomputer 3 proceeds to decision point 216 where it decides whether or not the pressure rise in the brake cylinder 7 is greater than a predetermined, critical fraction of the amount of pressure in the train air line 5. If the pressure rise in the brake cylinder 7 is greater than this predetermined critical fraction of the pressure in train air line 5, it indicates that electropneumatic valve 50 is correctly sealing, and that electropneumatic valve 55 is operating to provide an adequate pneumatic flow rate through the braking system. In this case, the microcomputer 3 proceeds on to block 218 of the flowchart. If the system fails this test, however, the microcomputer 3 proceeds to the previously described "fail subroutine A."

Assuming that this test is passed, the microcomputer 3 proceeds to block 218 and performs still another test by reading pressure sensor 44, opening electropneumatic valve 58 for one second, and then reading pressure sensors 44 and 48. From the initial value of pressure sensor 44 and the previously read value of pressure sensor 48, the expected increase in the brake cylinder 7 for a one-second opening of electropneumatic valve 55 is computed. The microcomputer 3 then proceeds to decision point 220, where it decides whether or not the actual increase in the air pressure of the brake cylinder 7 is greater than or equal to the calculated value of this air pressure increase. If so, then electropneumatic valve 55 is operating correctly, and the microcomputer 3 proceeds on to block 222. If not, the microcomputer 3 proceeds to "fail subroutine A."

Assuming that this last test was successful, the microcomputer 3 proceeds to block 222 and opens electropneumatic valve 50. The purpose of this step is to relieve the pressure of the brake cylinder 7. After completion of this step, the microcomputer 3 moves on to block 224 in FIG. 5B.

At block 224, the microcomputer 3 reads the output of the ultrasonic height sensor 13 and compares the value of this reading against preset limits stored in the memory of the microcomputer 3. These limits are derived from the maximum and minimum heights that it is possible to measure based on unloaded and loaded car conditions, as well as the installation position of the ultrasonic transmitter of the ultrasonic height sensor 13. While such checks will not indicate with certainty that the ultrasonic height sensor 13 is working correctly, they will indicate that there is a high probability that the ultrasonic height sensor 13 is working correctly.

If the ultrasonic height sensor 13 fails to pass the above-mentioned test, the microcomputer 3 proceeds to block 227, and sends a "UHS fail" signal to the transceiver 2. The microcomputer 3 then proceeds to input/output block 231, and sets a UHS fail flag in the computer memory. The microcomputer 3 subsequently assumes that the car is not loaded and sets the maximum allowable braking force so as not to slide the wheels under an unloaded condition. The microcomputer 3 then proceeds to block 232.

However, if the ultrasonic height sensor 13 passes this test, the microcomputer 3 proceeds to block 228 and reads pressure sensor 20. If the reading of pressure sensor 20 is less than 60 psi, the microcomputer 3 proceeds to block 229, and waits 60 seconds. After the 60 second time limit has expired, the microcomputer then loops back to block 228, where pressure sensor 20 is read again. When the reading of pressure sensor 20 is greater than 60 psi, the system is completely ready to operate and there should be enough energy in the train air line 5 to operate the air driven power supply 11 to bring the system up to full voltage.

The microcomputer 3 then proceeds to block 232 and reads the power supply voltage sensor 6. The voltage read from sensor 6 is then compared at decision point 234 to a critical voltage value which is incorporated into the microcomputer program. If the voltage read is not above this critical level, the microcomputer proceeds to "fail subroutine A." However, if the voltage reading from sensor 6 is greater than or equal to the preset voltage value entered into the program, the microcomputer 3 proceeds to block 236, where it sends a system status signal to the transceiver 2 indicating that the entire system is working satisfactorily. At this point, the microcomputer 3 proceeds to block 240 of FIG. 5C.

At block 240, the microcomputer 3 switches itself onto a standby status in order to conserve power. While the microcomputer 3 is on standby, one of the computer operations that is still functioning is a two second counter. The microcomputer 3 proceeds to block 242 after it is put on a standby status, and the two second counter is started. The microcomputer 3 then proceeds to block 244 where the two second timing counter is incremented. The microcomputer 3 next proceeds to decision point 246 where it compares the time recorded on the counter, and compares it to two seconds. If the time is not greater than two seconds, the microcomputer 3 loops back to block 244. When the time is greater than two seconds, the microcomputer 3 proceeds to block 248, and resets the two second timing counter to zero. The microcomputer 3 then proceeds to block 250 where it is powered up from its standby status.

The microcomputer 3 next proceeds to block 260 where it reads the voltage of battery 9 via voltage sensor 6. The microcomputer 3 then proceeds to decision point 262, where this voltage reading is compared with the maximum allowable system voltage. If the voltage reading is greater than the maximum voltage entered into the program, the microcomputer 3 proceeds to input/output block 263 and closes electropneumatic valve 73. The microcomputer 3 then proceeds to block 270 of FIG. 5D. If, however, the voltage read from voltage sensor 6 is less than the maximum allowable system voltage, the microcomputer 3 proceeds from decision point 262 to a further decision point 264, where it compares the voltage read from voltage sensor 6 with the minimum allowable system voltage. If the voltage so read is less than the minimum allowable system voltage, the microcomputer 3 proceeds to input/output block 265 and opens dump valve 100. By opening dump valve 100, the normally opened valve 73 is opened and compressed air is supplied to the air driven power supply 11. The program then moves on to block 270 of FIG. 5D. If, on the other hand, the voltage read from voltage sensor 6 is greater than the minimum system voltage inserted into the program, the computer 3 moves directly to block 270 of FIG. 5D without going through block 265 as heretofore described.

Figure 5C:
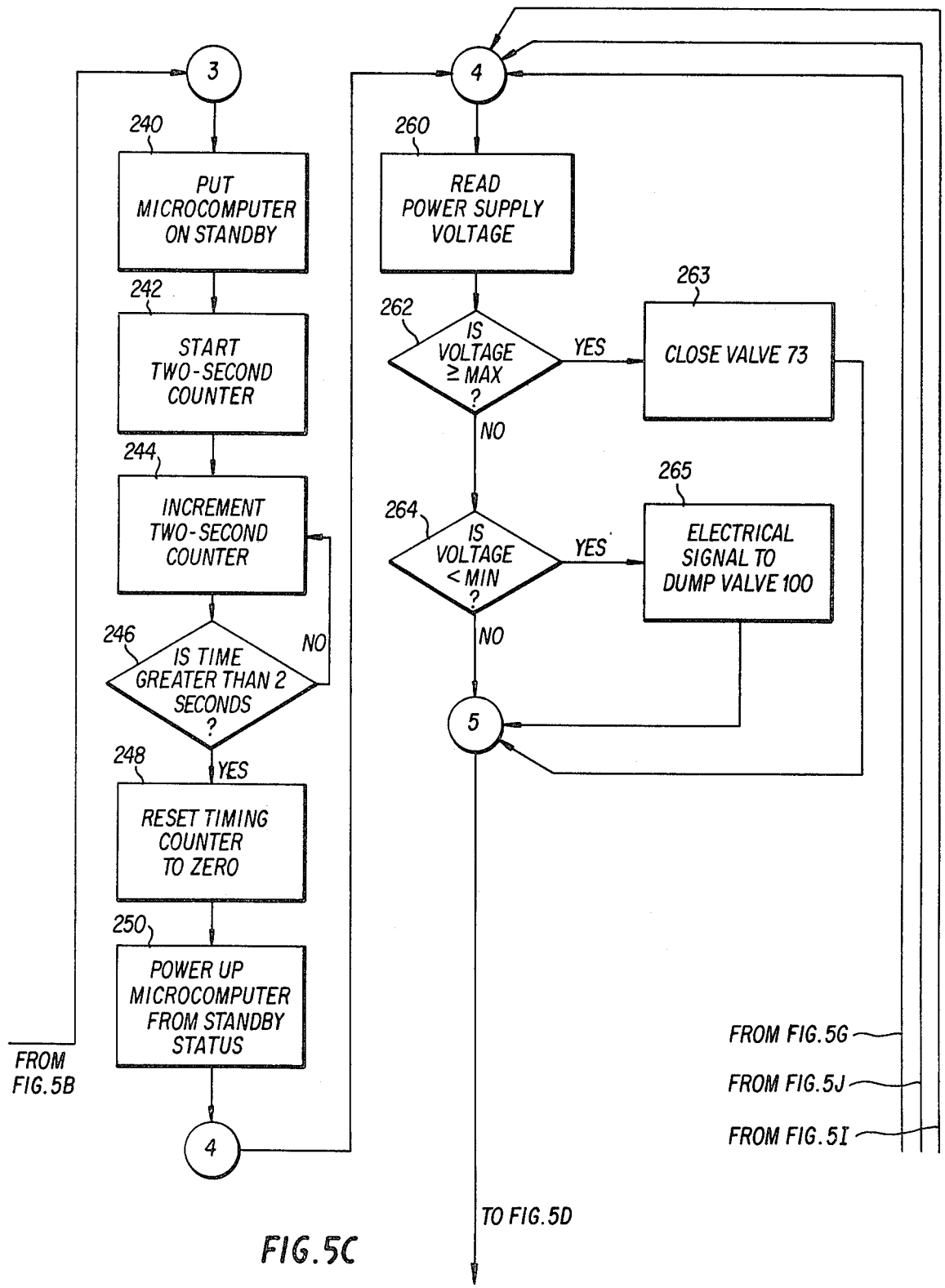
Figure 5D:
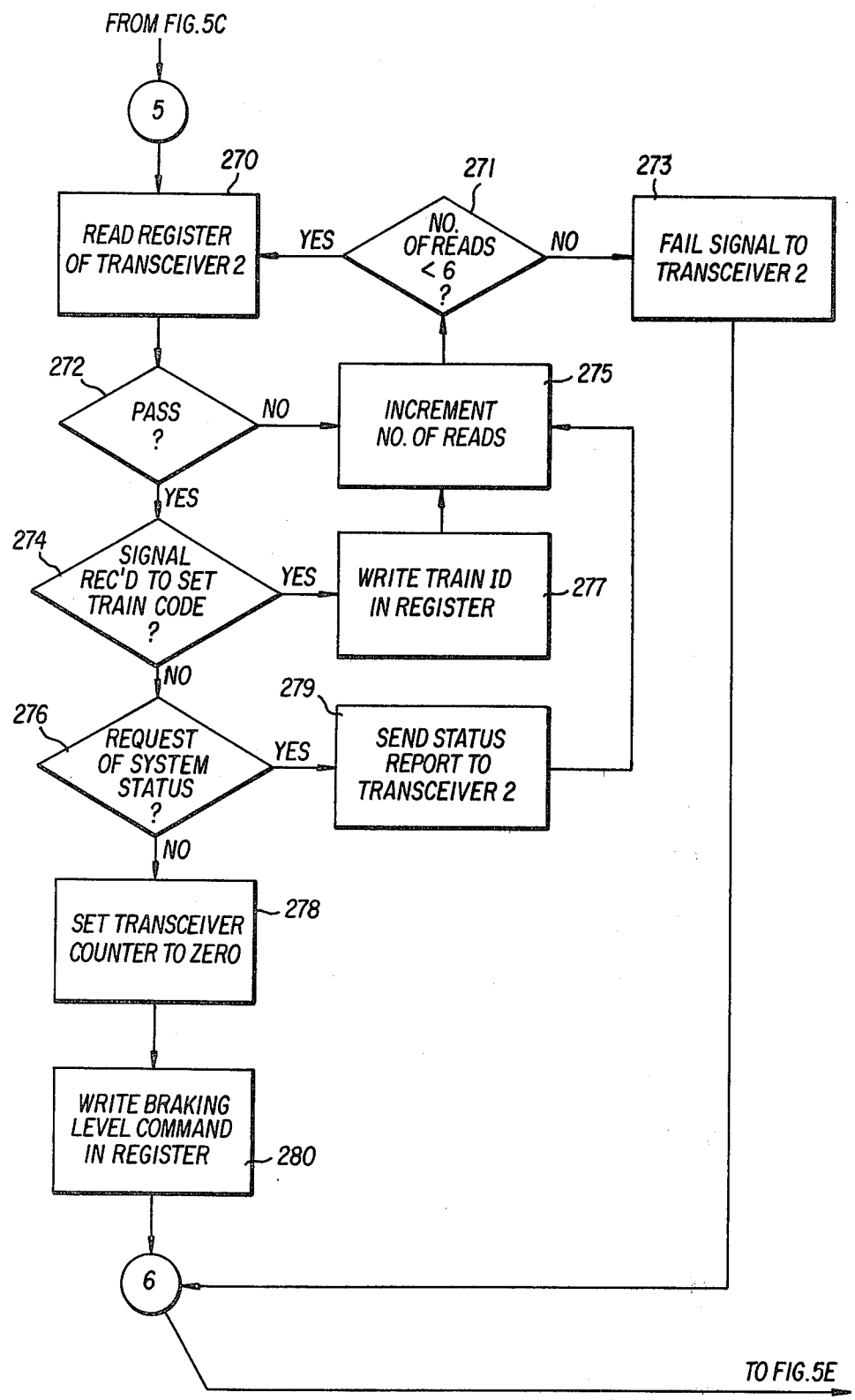

At block 270 on FIG. 5D, the microcomputer 3 reads a register incorporated into the transceiver 2. The information in this register is checked for errors by the use of error detection and correction codes on the message itself, as well as a complementary computer program which will not be described in detail. If the information on the register fails to pass the error detection test, the microcomputer 3 proceeds to block 275, where a counter is incremented which registers the number of times the transceiver register read has been attempted. If the number of register reads is less than 6, the computer 3 loops back to block 270, where the process is repeated. However, if the number of register reads is 6 or greater, the microcomputer 3 proceeds to input/output block 273 where it transmits a signal to the transceiver 2 that the radio portion of the system is not working correctly. From there, the microcomputer 3 proceeds to a subroutine (FIGS. 5E-5F) which allows the system to operate in a mode that emulates a conventional air brake system. This subroutine will be described in detail hereinafter.

If the transceiver register is read correctly within five reads, the microcomputer 3 stores the information that has been read from the register and proceeds to decision point 274, where it decides whether or not the signal received from the locomotive control unit 4 is to set a train code identification into the memory of the microcomputer 3. If a transmission to set a train code identification was received by the transceiver 2 of the system, the microcomputer 3 proceeds to block 277 and writes the train identification code into the microcomputer memory, and resets the transceiver 2 output. From there, the microcomputer 3 proceeds back to block 275 and increments the number of reads in the decision loop that determines whether or not the number of reads was less than 6. This portion of the program insures that the system will not become trapped in a loop due to the train code being set and never subsequently changing, or for any other reason.

If the message from the transceiver 2 is not to set the train code identification, the microcomputer 3 proceeds to block 276 to determine whether or not there is a message from the locomotive control unit to request a report on the system status. If there is such a request, the system proceeds to block 279 and the microcomputer 3 sends a status report to the transceiver 2, after which it proceeds back to block 275 and increments the number of reads of the transceiver register. If there is no such message from the locomotive control unit, or any other control unit, to request a status report, the microcomputer proceeds to block 278, and resets the transceiver 2 output to zero. The function of this step is to avoid having a valid braking command in the transceiver register that is incorrect due to a failure in the radio transmission from the locomotive control unit 4.

The computer next proceeds to block 280, where it takes the information previously read from transceiver 2 and stored, and stores this information in the braking command register of microcomputer 3. At this point, the microcomputer proceeds to block 290 of FIG. 5E. The portion of the program illustrated on FIGS. 5E and 5F covers the logic associated with making the system operate as a conventional brake system based on pressure signals from the train air line 5.

Figure 5E:
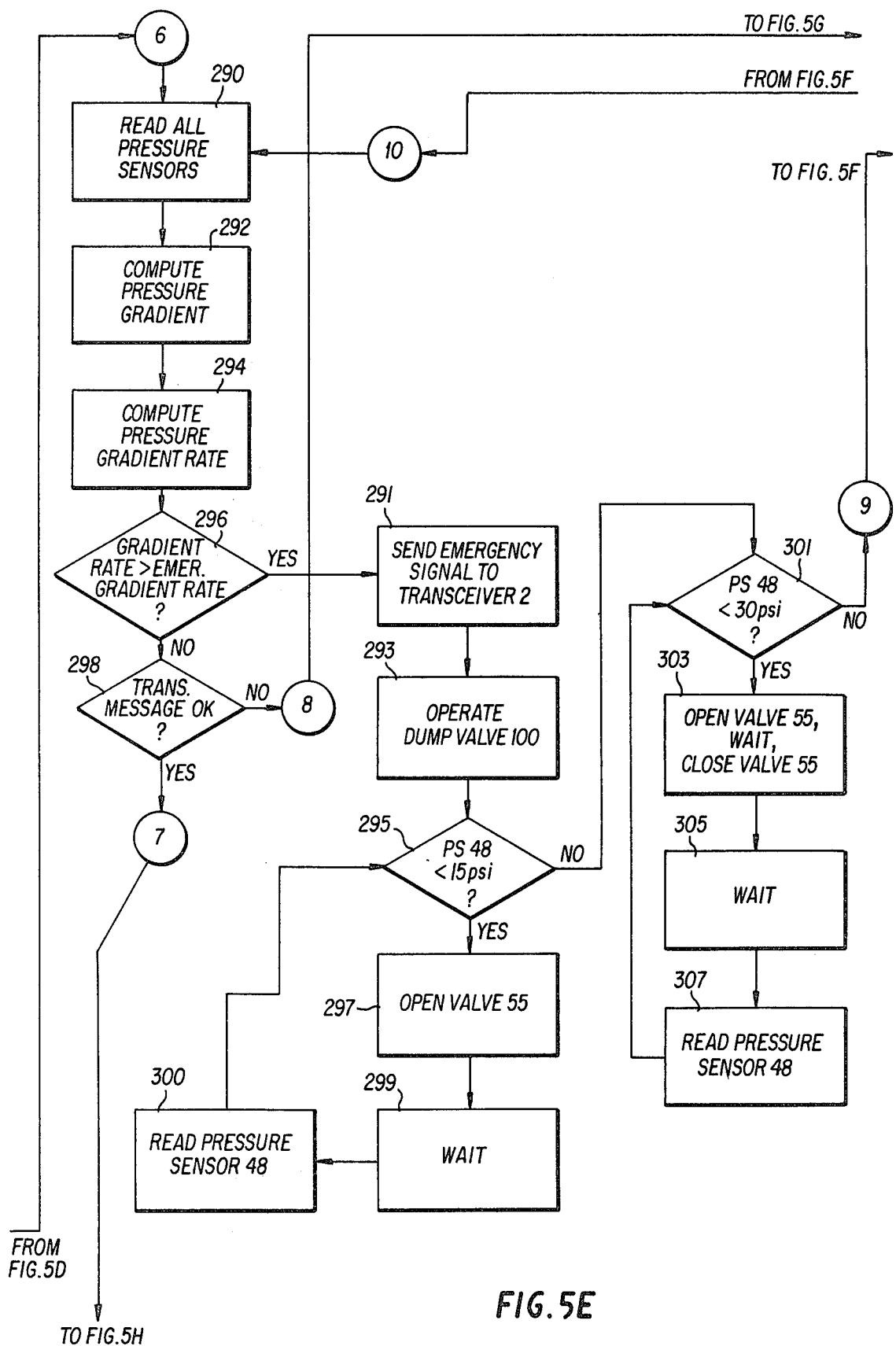

In block 290 of FIG. 5E, the microcomputer 3 reads the values of all the pressure sensors 20, 44, 46, and 48. From there, the microcomputer 3 proceeds to block 292, and computes a pressure gradient. The computation of a pressure gradient is necessary in determining whether or not an emergency signal is present. After the pressure gradient is computed, the microcomputer 3 proceeds to block 294 and computes the pressure gradient rate by dividing the pressure gradient computed in block 292 by the time elapsed (in minutes) since the last pressure reading was taken in the pressure sensors 20, 44, 46, and 48. After this computation is accomplished, the microcomputer 3 proceeds to decision point 296, where it determines whether or not the pressure gradient rate computed in block 294 is greater than a gradient rate associated with an emergency braking command which has been stored in the memory of the computer. If this pressure gradient rate is greater than the gradient rate associated with the prestored emergency braking command, the microcomputer 3 proceeds to input/output block 291, where it sends an emergency signal to the transceiver 2. The purpose of this emergency signal to the transceiver 2 is to notify the engineer that the system is going into an emergency status.

1. Emergency Status Program Sequence

From block 291, the microcomputer proceeds to block 293, and opens dump valve 100 to insure that electropneumatic valve 50 is closed. After this step is accomplished, the microcomputer next proceeds to decision point 295, where it determines whether or not the reading of pressure sensor 48 is less than 15 psi. If this pressure reading is less than 15 psi, the microcomputer 3 proceeds to input/output block 297, and opens solenoid-operated valve 85 for a time computed by microcomputer 3 to increase the pressure in brake cylinder 7 to 16 psi through the operation of main valve 86. Next, the microcomputer 3 proceeds to block 299 and waits a predetermined amount of time for the air to flow from the auxiliary air reservoir 33 into the brake cylinder 7. After this predetermined period of time has elapsed, the microcomputer 3 proceeds to block 300 and reads pressure sensor 48.

After reading pressure sensor 48, the microcomputer 3 loops back to decision point 295, where it decides again whether or not the value of pressure sensor 48 is less than 15 psi. The microcomputer 3 continues in this loop until the reading of pressure sensor 48 is equal to or greater than 15 psi. When the reading is equal to or greater than 15 psi, the microcomputer 3 proceeds to decision point 301.

At decision point 301, the microcomputer 3 decides whether or not the reading of pressure sensor 48 is less than 30 psi. If this reading is less than 30 psi, the microcomputer 3 proceeds to block 303 and opens solenoid valve 85 (and hence electropneumatic valve 55) for an amount of time computed to bring the reading of pressure sensor 48 to over 30 psi. The microcomputer 3 then proceeds to block 305, where it waits a predetermined amount of time to allow air to flow into the brake cylinder 7. Next, the microcomputer 3 proceeds to block 307, where it reads pressure sensor 48 again. After this is accomplished, the microcomputer 3 loops back to decision point 301, and determines whether or not the pressure reading of pressure sensor 48 is equal to or greater than 30 psi.

Figure 5F:
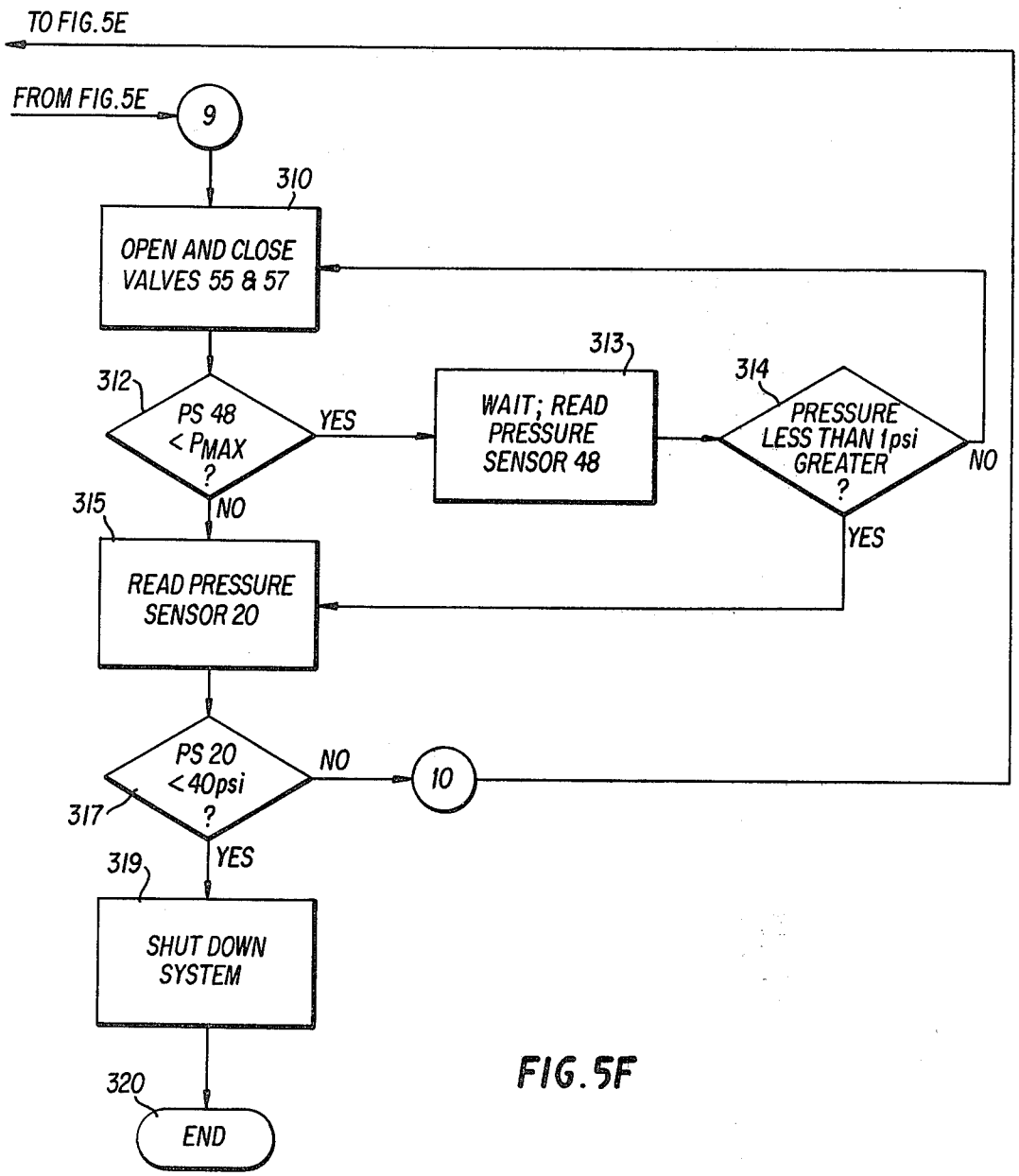
Figure 5G:
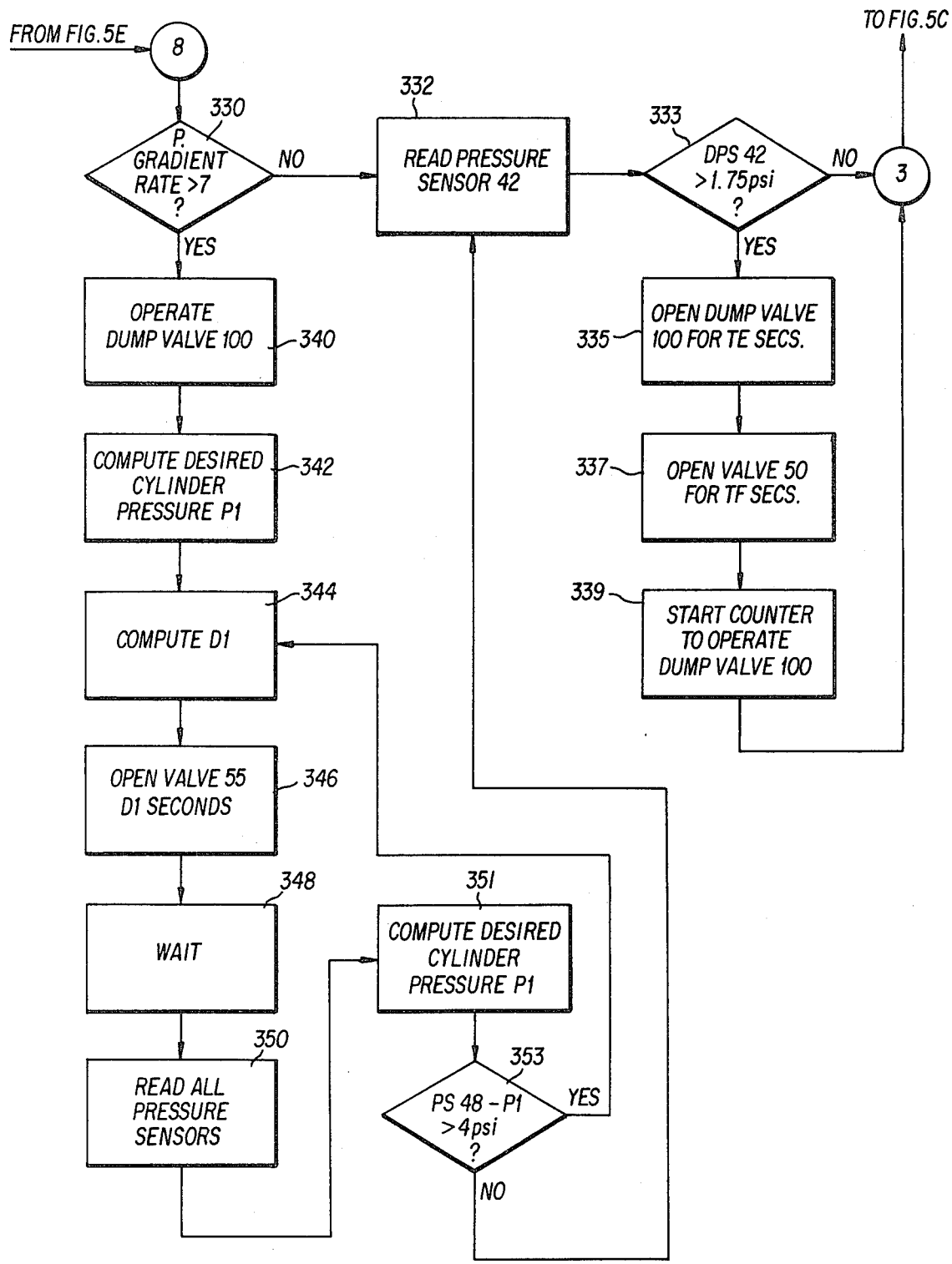

When this pressure reading is equal to or greater than 30 psi, the microcomputer 3 proceeds to block 310 of FIG. 5F. At this point, the microcomputer 3 opens electropneumatic valves 55 and 57 long enough to achieve 105% of PMAX. PMAX is a pressure approximately 10% below the pressure that would cause wheels to slide for an empty car. The microcomputer 3 then proceeds to decision point 312, where it decides whether or not the reading of pressure sensor 48 is less than PMAX. If so, the microcomputer 3 proceeds to block 313, where it waits a predetermined amount of time and then reads pressure sensor 48 again. From here, the microcomputer 3 proceeds to decision point 314, and decides whether or not this second reading of pressure sensor 48 is at least 1 psi greater than the first reading of pressure sensor 48. If the difference between the two pressure readings is not less than one, the microcomputer 3 loops back to block 310, recomputes the period of time that solenoid valves 85 and 88 should be opened to open electropneumatic valves 55 and 58 in order to bring the pressure reading of pressure sensor 48 equal to 105% of PMAX, and opens these valves for this length of time. However, if the difference between the initial and second readings of pressure sensor 48 is less than one psi, there is no additional air left to increase the pressure in brake cylinder 7 even though the pressure is still below PMAX. In this event it will do no good to continue to send signals to electropneumatic valves 55 and 58. Therefore, the computer proceeds to block 315 and reads pressure sensor 20.

From block 315, the microcomputer 3 proceeds to decision point 317, where it decides whether or not the reading of pressure sensor 20 is less than 40 psi. If so, this indicates that the entire system should be shut down, and control transfers to a system shutdown routine comprised of blocks 319 and 320. However, if the reading of pressure sensor 20 is not less than 40 psi, control transfers back to block 290 of FIG. 5E to start the entire process over again. This portion of the program provides a path to get back into the normal system operation after emergency application has been made but where the train air line 5 has not been broken and where the locomotive control wants to release the brakes from emergency.

2. "Fail Error Detection Tests" Program Sequence

If the microcomputer 3 decides at decision point 296 of FIG. 5E that the pressure gradient rate computed in block 294 is less than the preset gradient rate associated with an emergency braking command, it proceeds to decision point 298, and decides whether or not the message from transceiver 2 passed all error detection tests. If it decides that the error detection tests were failed, the microcomputer 3 proceeds on to decision point 330 of FIG. 5G. At decision point 330, the microcomputer determines whether or not the pressure gradient rate is greater than 7 psi per minute. If it is not, the service brake should not be applied and the microcomputer 3 proceeds to block 332 to begin a process which will be described in detail hereinafter.

However, if the pressure gradient rate is determined to be greater than 7 psi per minute at decision point 330, the microcomputer 3 proceeds to block 340 and operates the solenoid dump valve 100. This step is performed to insure that electropneumatic valve 50 is closed so that a successful braking application can be made. The microcomputer next proceeds to block 342, and computes a desired cylinder pressure P1 of the brake cylinder 7. P1 is computed as a function of the pressure at pressure sensor 20 at the present time and the value of this pressure during the previous calculation cycle. After computing P1, microcomputer 3 proceeds to block 344 and computes the duration of the electrical signal D1 that should be sent to solenoid-operated valve 85 to achieve P1, the desired pressure of brake cylinder 7. D1 is a function of the pressure at pressure sensors 44, 46 and 48, as well as of P1. The pressure at pressure sensor 48 is required in the equation to determine how much the pressure must be increased. The pressure at pressure sensor 44 is required because it provides the air pressure to the valve operating diaphram of valve 55. The pressure at 46 is required because this is the source of the air that is going to increase the pressure in brake cylinder 7. The desired pressure P1 is the last item required in the computation of D1.

After completing this computation, the microcomputer 3 proceeds to input/output block 346, and sends an electrical signal of duration D1 to solenoid-operated valve 85.

The microcomputer 3 next proceeds to block 348, and waits a predetermined amount of time to allow the system pressures to come to equilibrium.

From this point, the microcomputer 3 proceeds to block 350 and reads all of the pressure sensors 20, 42, 44, 46 and 48. The microcomputer 3 next proceeds to block 351 and computes the desired pressure P1 of brake cylinder 7 again. The microcomputer 3 then proceeds to decision point 353, where it determines whether or not the pressure at pressure sensor 48 is within 4 psi of P1. The microcomputer 3 performs this operation by subtracting the pressure reading at pressure sensor 48 from P1, and comparing the answer with 4 psi. If the computer decides that the difference is greater than 4 psi, the microcomputer loops back to block 344 and recomputes the electrical signal duration D1 for opening solenoid-operated valve 85. However, if this difference in pressure is not greater than 4 psi, this indicates that the brake cylinder 7 is close enough to the desired cylinder pressure and the computer proceeds to loop to block 332, and reads differential pressure sensor 42.

The computer next proceeds to decision point 333, and decides whether or not the value of the differential pressure sensor 42 is less than 1.75 psi. If this value is not greater than 1.75 psi, the computer 3 loops back to block 240 of FIG. 5C and the entire computer process starts again. However, if this differential pressure is greater than 1.75 psi, this indicates that there is an air signal in train air line 5 that is commanding a brake release, and the microcomputer 3 proceeds to input/output block 335 and opens the electropneumatic dump valve 100 for a predetermined time period TE which is long enough to initially close all the electropneumatic valves 50, 55, and 58. This step of the process is necessary to insure that the air reservoirs 33 and 35 are not discharged through electropneumatic valves 55 and 58 when electropneumatic valve 50 is opened.

The microcomputer 3 then proceeds to block 337 and opens electropneumatic valve 50 for a predetermined amount of time TF to completely release the pressure on brake cylinder 7. After this is accomplished, the microcomputer 3 proceeds to block 339 and starts a counter to operate the electropneumatic dump valve 100 TG seconds later to close electropneumatic valve 50 after brake cylinder 7 is entirely vented. Since this will require several two-second cycles, it is done by separate counter rather than as an integral part of the program. The microcomputer 3 then proceeds to block 240 of sheet 3 and the entire computer process starts again.

3. "Pass Error Detection Tests" Program Sequence

Figure 5H:
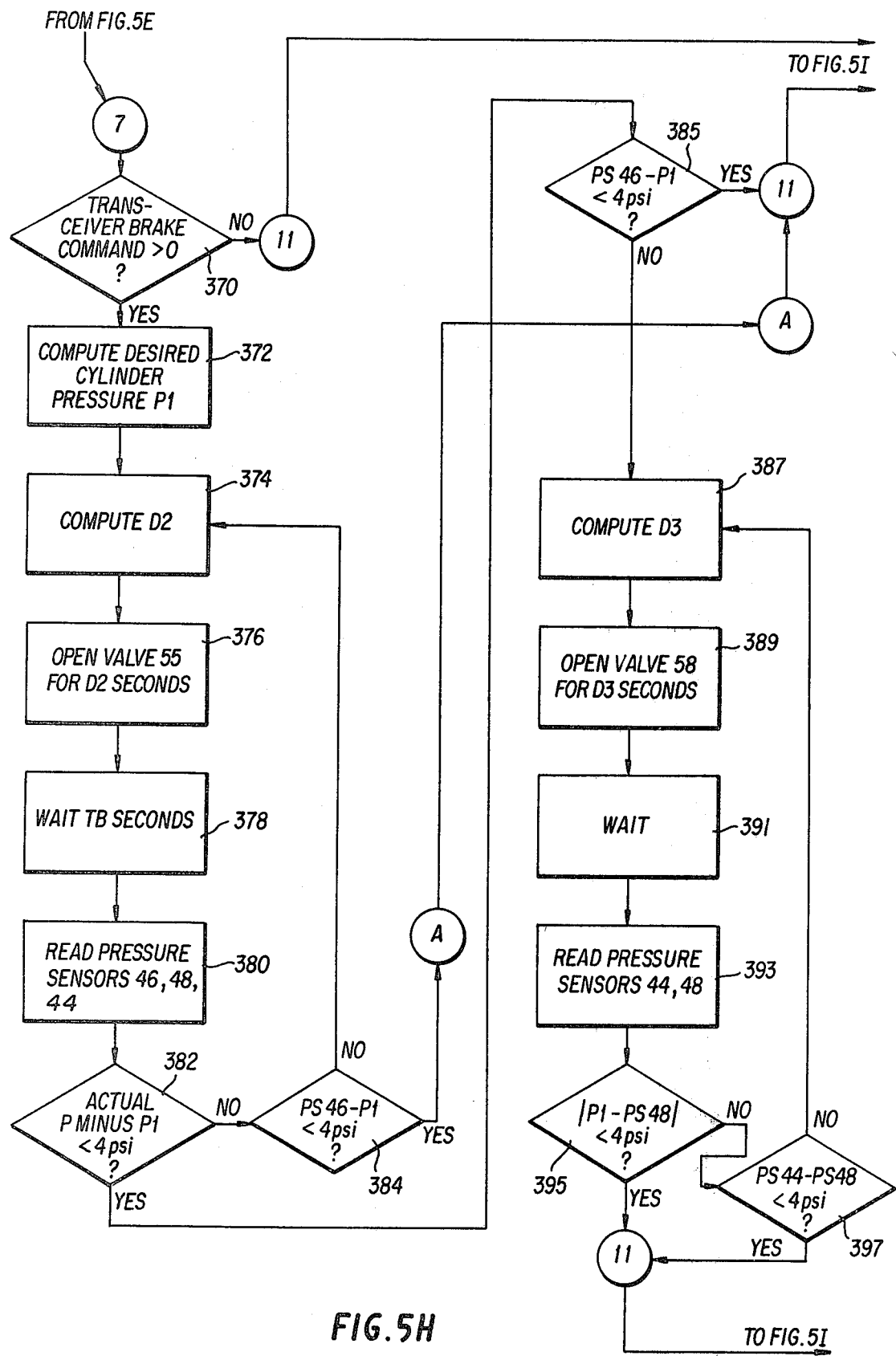

Assuming the microcomputer 3 determines that the error detection tests were passed, it then proceeds to decision point 370 of FIG. 5H, where it determines whether or not the command from the transceiver 2 is for any braking level other than zero. If not, the microcomputer 3 proceeds immediately to block 400 of FIG. 5I. That part of the program appearing in FIG. 5I will be described in detail hereinafter. If the command from the transceiver 2 is different from zero, microcomputer 3 proceeds to block 372 and computes the desired pressure P1 of brake cylinder 7. At this point in the program, P1 is a function of the command from the transceiver 2 and the stored height value from the ultrasonic height sensor 13. By the use of the value from the ultrasonic height sensor 13, there is an automatic compensation for the freight car load.

After this computation is accomplished, the microcomputer 3 proceeds to block 374, where it computes the duration of the electrical signal to electropneumatic valve 55 necessary to achieve P2. This duration (D2) is a function of P2 and of the pressures at pressure sensors 48 and 46. From here, the microcomputer 3 proceeds to input/output block 376 where it transmits an electrical signal of duration D2 to electropneumatic valve 55. The microcomputer 3 then proceeds to block 378 where it counts off TB seconds to allow the brake cylinder 7 to fill.

The microcomputer 3 next proceeds to block 380 where it reads pressure sensors 44, 46 and 48. The microcomputer 3 then proceeds to decision point 382, and determines whether or not the pressure of brake cylinder 7 is within 4 psi of the desired pressure P1. If the pressure difference is less than 4 psi, the microcomputer 3 proceeds to decision point 385. If the difference is 4 psi or greater, the microcomputer 3 proceeds to decision point 384.

At decision point 384, the microcomputer 3 determines whether or not control needs to be shifted to the emergency reservoir 35 by subtracting the difference in the readings between pressure sensor 46 and pressure sensor 48 and comparing the results to 4 psi. If this difference is less than 4 psi, there is not sufficient air pressure remaining in the auxiliary air reservoir 33 to further substantially increase the pressure of brake cylinder 7. Therefore, the microcomputer 3 proceeds to that part of the program (beginning at block 385) that uses the air in the emergency air reservoir 33.

However, if the difference in pressures is greater or equal to 4 psi. microcomputer 3 proceeds to loop back to block 374 to repeat the brake cylinder 7 pressurization process.

At decision point 384, the microcomputer 3 determines whether or not the difference between P1 and the reading of pressure sensor 46 is less than 4 psi. If so, this indicates that the pressure of brake cylinder 7 is close enough to the desired point to stop pressurizing it, and control transfers to block 400 of FIG. 5I. If the two pressures are not within 4 psi of each other, however, the microcomputer 3 proceeds to block 387 and computes D3, the duration of the electrical signal required to open electropneumatic valve 58 and to allow air to flow from the emergency air reservoir 33 into the brake cylinder 7. After this computation is accomplished, the microcomputer 3 proceeds to block 389 and transmits an electrical signal of D3 duration to electropneumatic valve 58. The microcomputer 3 next proceeds to block 391 and waits for a predetermined amount of time to allow air to flow from the emergency air reservoir into the brake cylinder 7. After this is accomplished, the microcomputer proceeds to block 393, and reads pressure sensors 44 and 48.

After these pressure sensors have been read, the microcomputer proceeds to decision point 395 and determines whether or not the absolute value of the difference between P1 and the reading from pressure sensor 48 is less than or equal to 4 psi. If this difference is less than 4 psi, the microcomputer 3 proceeds to block 400 of sheet FIG. 5I. However, if this difference is greater than 4 psi, the microcomputer 3 instead proceeds to decision point 397 and compares the readings of pressure sensors 44 and 48 to determine whether or not there is sufficient air left in the emergency air reservoir 35 to further increase the pressure of the brake cylinder 7. If this pressure differential is 4 psi or greater, the computer loops back to block 387 and recomputes the electrical signal duration (D3) to electropneumatic valve 58 necessary to bring the pressure of the brake cylinder 7 to P1, the desired value.

Figure 5I:
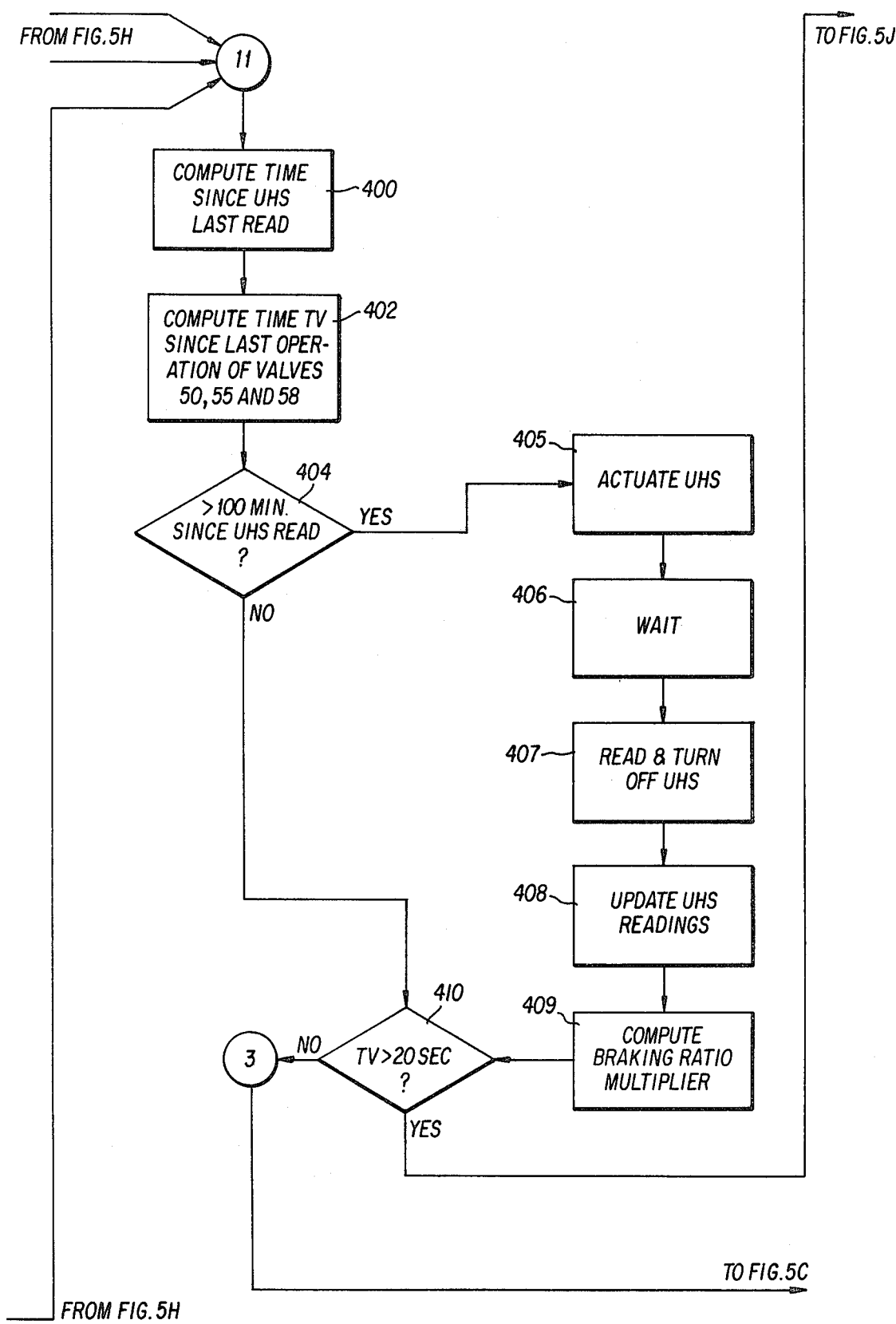

However, if the pressure difference between the readings of pressure sensors 44 and 48 is less than 4 psi, this indicates that there is not sufficient air pressure remaining in the emergency air reservoir 35 to significantly increase the pressure of brake cylinder 7, and control transfers to block 400 of FIG. 5I.

After the microcomputer 3 has proceeded to block 400, it computes the time since the ultrasonic height sensor 13 was last read. The microcomputer 3 then proceeds to block 402 and computes the time (TV) since the last operation of the electropneumatic valves 50, 55 and 58. After this computation is performed, the microcomputer 3 proceeds to decision point 404 and determines whether more than 100 minutes has elapsed since the last time the ultrasonic height sensor 13 was read. If it decides that more than 100 minutes has elapsed, the microcomputer 3 proceeds to input/output block 405 and actuates the ultrasonic height sensor 13. The microcomputer 3 then proceeds to block 406 and waits for a time period long enough to obtain an accurate reading from the ultrasonic height sensor 13. Microcomputer 3 next proceeds to block 407, where it reads and then turns off the ultrasonic height sensor 13. Next, the microcomputer 3 proceeds to blocks 408 and 409, where it updates the maximum height, minimum height, and present height readings of the ultrasonic height sensor 13 which are in the computer memory, and then proceeds to compute a braking ratio multiplier. The microcomputer 3 finally proceeds to decision point 410.

Referring back to decision point 404, and assuming now that the microcomputer has determined that more than 100 minutes has not elapsed since the last ultrasonic height sensor reading, it then proceeds to decision point 410 and determines whether or not any of the electropneumatic valves 50, 55, or 57 have been operated during the past 20 seconds. If none of them have been operated during the last 20 seconds, the microcomputer 3 proceeds to block 412 of FIG. 5J. However, if any of these electropneumatic valves have been operated during the past 20 seconds, the microcomputer 3 proceeds to block 240 of FIG. 5C.

Figure 5J:
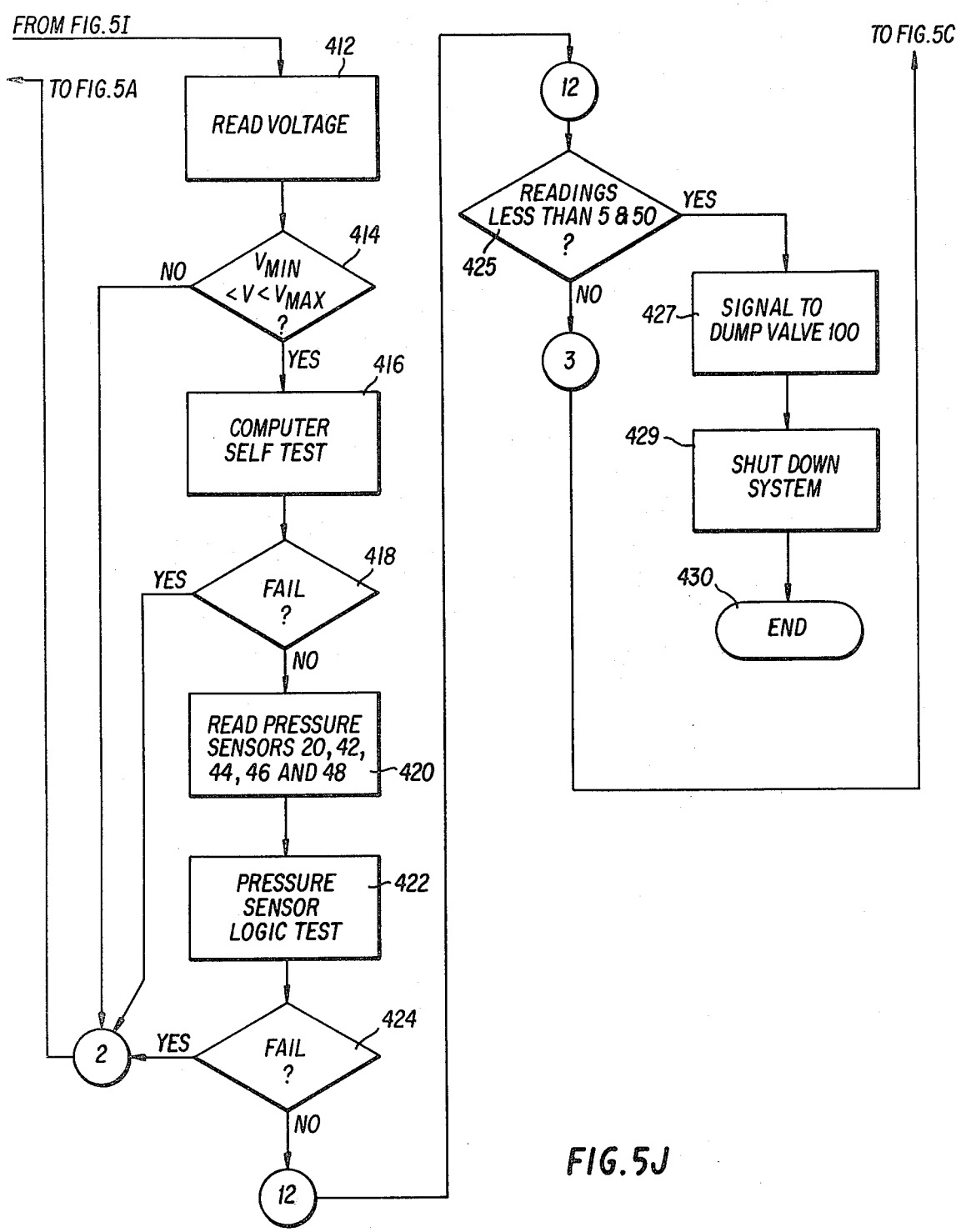

At block 412 in FIG. 5J, the microcomputer 3 begins a series of diagnostic tests on the entire system. At block 412, the microcomputer 3 reads the voltage of the power supply 11. It then proceeds to decision point 414 and compares the voltage read in block 412 with preprogrammed acceptable minimums and maximums. If it decides that the voltage of the power supply 11 is within the acceptable range of minimums and maximums, it proceeds to block 416 and performs a computer self-test, as previously described in connection with FIG. 5A. However, if the supply voltage is not within the range of acceptable limits, the microcomputer 3 reverts back to "fail subroutine A" of FIG. 5A, previously described in detail.

After performing the computer self-test of block 416, the microcomputer 3 proceeds to decision point 418 and determines whether or not it has failed its self-test. If the microcomputer 3 decides that it has failed, it loops back to the "fail subroutine A" of FIG. 5A. However, if it determines that it has not failed its self-test, it proceeds on to block 420 and reads pressure sensors 20, 42, 44, 46 and 48. After these readings are taken, the microcomputer 3 proceeds to block 422 and performs a simplified pressure sensor logic test that provides a determination of whether the electropneumatic valves appear to be operating correctly. This simplified test is as follows:

If the difference between the pressure readings of pressure sensors 20 and 46 is greater than 4 psi, the system fails the test.

If the difference between the readings of pressure sensor 20 and pressure sensor 44 is greater than 4 psi, the system fails the test.

If the reading of the differential pressure sensor 42 is less than 10 psi and the absolute value of the difference between the readings of pressure sensor 20 and pressure sensor 44 minus the reading of differential sensor 42 is greater than 1 psi, the system fails the test.

If the reading of the differential pressure sensor 42 is greater than 2 psi and the reading of pressure sensor 48 is greater than 2 psi, the system fails the test.

If the system fails any of the above logic tests, the microcomputer 3 loops back to "fail subroutine A" of FIG. 5A. However, if the microcomputer does not fail the test, it proceeds on to decision point 425 and decides whether or not the pressure reading of pressure sensor 20 is less than 5 psi and the reading of pressure sensor 44 is less than 50 psi. If the computer determines that both of these conditions are met, this indicates that there is no air pressure in air train line 5 and that the pressure remaining in the air reservoirs 33, 35 is not adequate to operate the air-driven power supply 11 for any significant length of time. At this point, it is desired to shut the entire system down to reduce the charging time for the air-driven power supply 11 when the system is again started up. Thus, the microcomputer 3 proceeds to input/output block 427 and sends a signal to the solenoid-operated dump valve 100, which closes the electropneumatic valves 50, 55, and 58 and opens electropneumatic valve 73. The primary purpose of this signal is to make sure that electropneumatic valve 73 is open to provide a path for air from the train air line 5 to the air-driven power supply 11 when the system is again charged. After this step is completed, the microcomputer 3 proceeds to block 429 and shuts down the computer and the entire system.

If it is determined at decision point 425 that the pressure of air line 5 is greater than 5, or that the pressure at pressure sensor 44 is greater than 50 psi, control is transferred back to block 240 of FIG. 5C.

Summary of System Operation

In blocks 200 through 236 of the flow chart, the microcomputer 3 starts up and tests both the operability of the ultrasonic height sensor 13, as well as the electropneumatic valves 50, 55, 58 and 73.

In blocks 240 through 250, the microcomputer 3 places itself on standby to conserve energy, actuating itself only momentarily every 2 seconds to carry out the balance of the decisions in the program.

In blocks 260 through 265, the microcomputer 3 determines whether or not the voltage available from the rechargeable battery pack 9 falls within an acceptable range, and attempts to correct an over-voltage or under-voltage condition.

In blocks 270 through 280, the microcomputer 3 checks to determine whether a locomotive control unit 4 has entered a braking level command into the register of the transceiver 2, and enters this command into its memory if one has been so entered. The microcomputer 3 also checks to make sure that no errors are present in any of the information contained in the register of the transceiver 2. If errors are present, the microcomputer 3 commands the transceiver 2 to send a "fail" signal to the locomotive control unit 4.

In blocks 290 to 296, the microcomputer 3 checks to determine whether or not an emergency braking command has been pneumatically sent through the train air line 5.

If such a pneumatic emergency signal has been detected, the microcomputer executes blocks 291 through 320 which puts the system into an emergency status and applies the brakes.

If no such pneumatic emergency signal has been detected, the microcomputer proceeds to decision point 298, and determines whether or not the message from the register of the transceiver 2 is in any way defective.

If it determines that the message is defective, the microcomputer proceeds to execute blocks 330 through 350, which causes the electropneumatic system of the invention to operate via pneumatic signals from the train air line 5, rather than from radio signals from the transceiver 2.

If it decides that the message from the register of the transceiver is not defective, the microcomputer 3 executes steps 370 through 430, thereby operating the braking system under radio control, and runs periodic "self-tests" which will place the braking system under pneumatic control if any of the tests are failed.

Although the present invention has been described with reference to a preferred embodiment, it is to be understood that the invention is not limited to the details thereof. Many routine modifications and substitutions will occur to those of ordinary skill in the art in light of the foregoing detailed description, and all such modifications and substitutions are intended to fall within the spirit and scope of the invention as defined in the appended claims.

What is claimed is:

1. An air brake control system for controlling the air brakes of a railroad car of the type including a train air line connected to at least one air reservoir, wherein said air reservoir is in turn connected to the brake cylinder of the railroad car, comprising:
    (a) a first check valve connected between said train air line and said air reservoir for impeding the flow of air from said air reservoir back to said train air line,
    (b) a differential pressure sensor connected on both sides of said check valve for measuring the difference in air pressure between said train air line and said brake cylinder,
    (c) a first electropneumatic valve pneumatically connected between said air reservoir and said brake cylinder for controlling the flow of pressurized air from said reservoir into said brake cylinder,
    (d) a first pressure sensor connected between said first electropneumatic valve and said brake cylinder for measuring the air pressure in said brake cylinder,
    (e) a second electropneumatic valve pneumatically connected to said brake cylinder for controllably venting said brake cylinder, and
    (f) a microcomputer including a radio operated transceiver unit and electrically connected to said differential pressure sensor and said first pressure sensor and said first and second electropneumatic valves for receiving electropneumatic braking signals through said transceiver and pneumatic braking signals through said train air line and opening said first electropneumatic valve to both place said brake cylinder in fluid communication with said air reservoir and lower the pressure of the air reservoir to a point where said check valve admits additional air to said air reservoir from said train air line thereby applying said air brakes and pneumatically propagating said braking signal.

2. The air brake control system of claim 1 wherein said air reservoir includes an auxiliary air reservoir and an emergency air reservoir, and said train air line is connected in parallel to both said auxiliary air reservoir and said emergency air reservoir, and said first check valve is pneumatically connected between said train air line and said auxiliary air reservoir, and a second check valve is pneumatically connected between said train air line and said emergency air reservoir.

3. The air brake control system of claim 2 further including
(a) a second pressure sensor pneumatically connected between said first check valve and said auxiliary air reservoir and electrically connected to said microcomputer for measuring the pressure of said auxiliary air reservoir and electrically communicating the value of this pressure to said microcomputer, and
(b) a third pressure sensor pneumatically connected between said second check valve and said emergency air reservoir for measuring the value of the air pressure of the emergency air reservoir and electrically communicating the value of this air pressure to said microcomputer, and
(c) a fourth pressure sensor pneumatically connected to said train air line and electrically connected to said microcomputer for measuring the air pressure of said train air line and electrically communicating the value of this air pressure to said microcomputer.

4. The air brake control system of claim 3 further including a radio transmitting unit for transmitting brake engagement and release signals to said transceiver unit of said microcomputer.

5. The air brake control system of claim 4 further including a rechargeable battery electrically connected to said microcomputer for powering said microcomputer, and an air driven power supply electrically connected to said battery and pneumatically connected to said auxiliary air reservoir and said emergency air reservoir for recharging said battery.

6. The air brake control system of claim 5 further including an ultrasonic height sensor electrically connected to said microcomputer for electrically transmitting a height signal to said microcomputer, and wherein said microcomputer is programmed to respond to said height signal by transmitting an emergency signal from said transceiver to a central control unit when a derailment occurs.

7. The air brake control system of claim 6, wherein said microcomputer is further programmed to respond to said height signal by automatically adjusting the braking force in accordance with the railroad car loading.

* * * * *